United States Patent Office 2,907,707
Patented Oct. 6, 1959

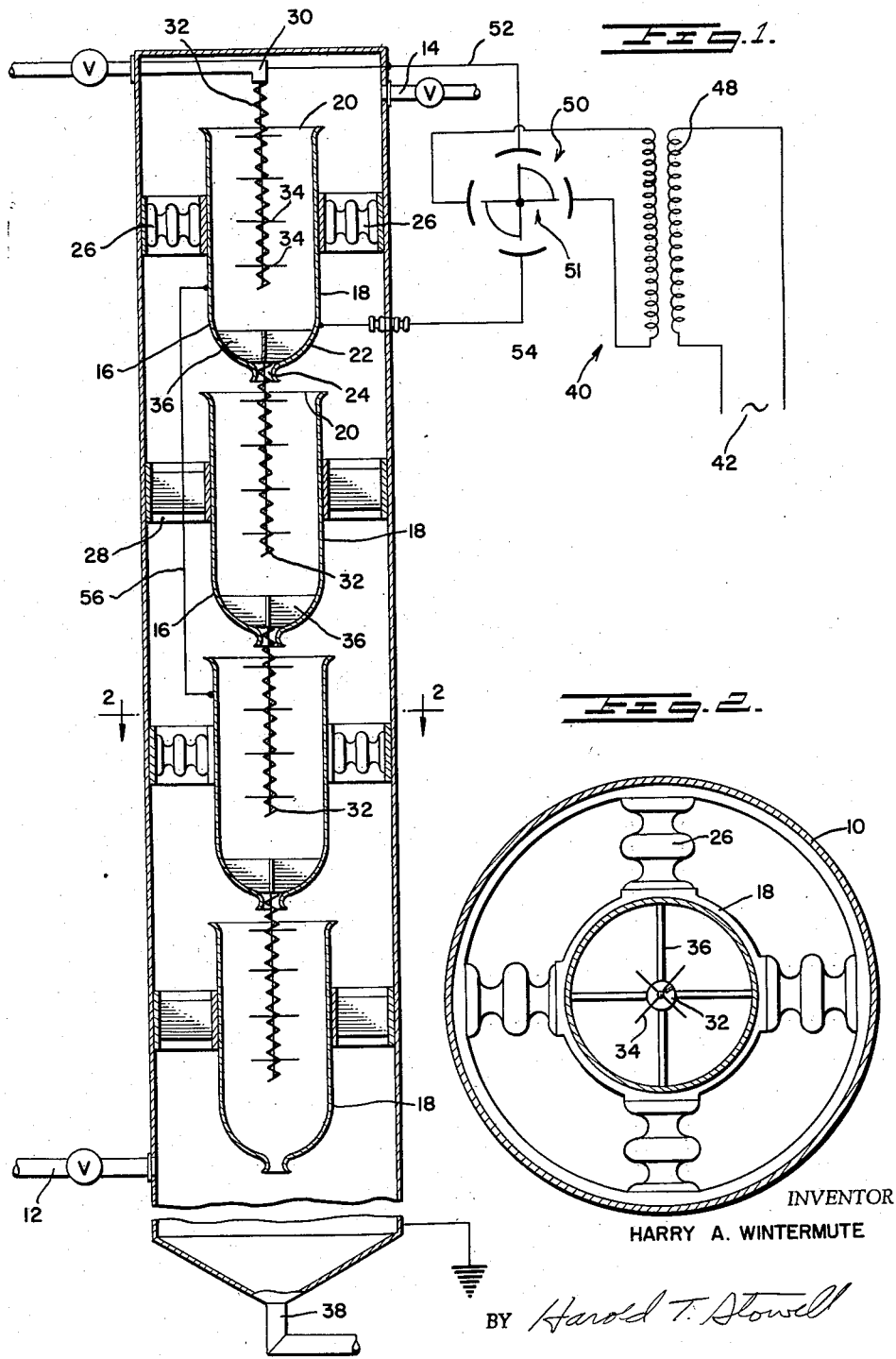

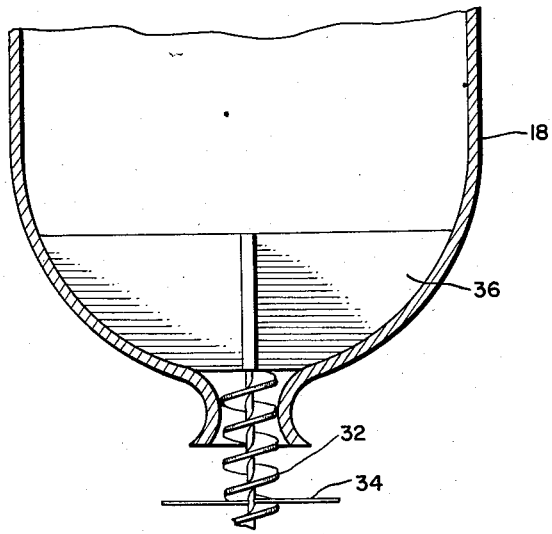
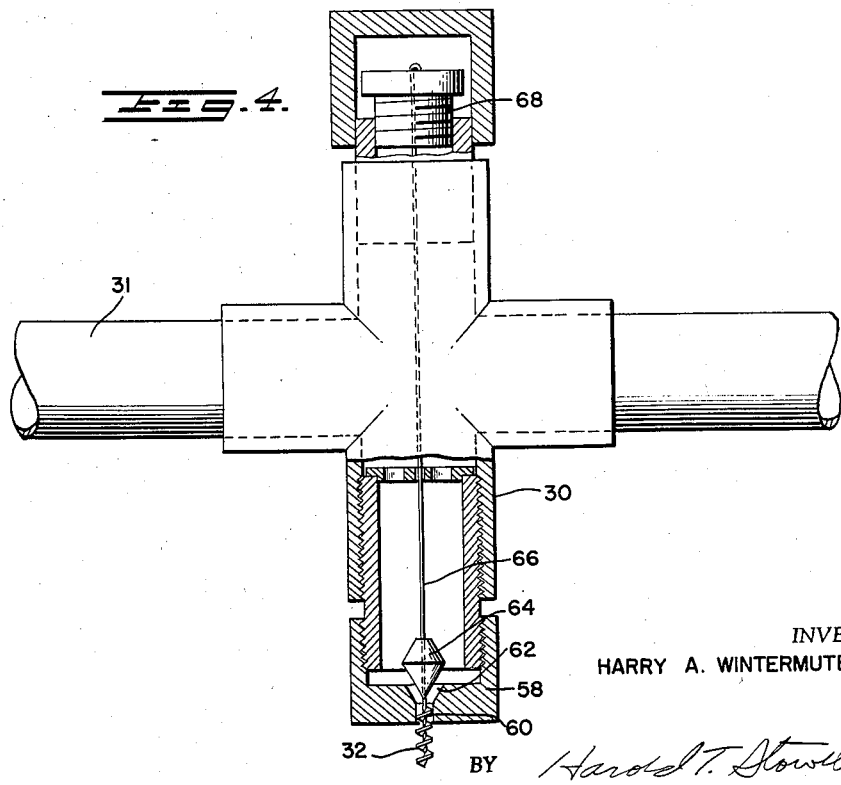

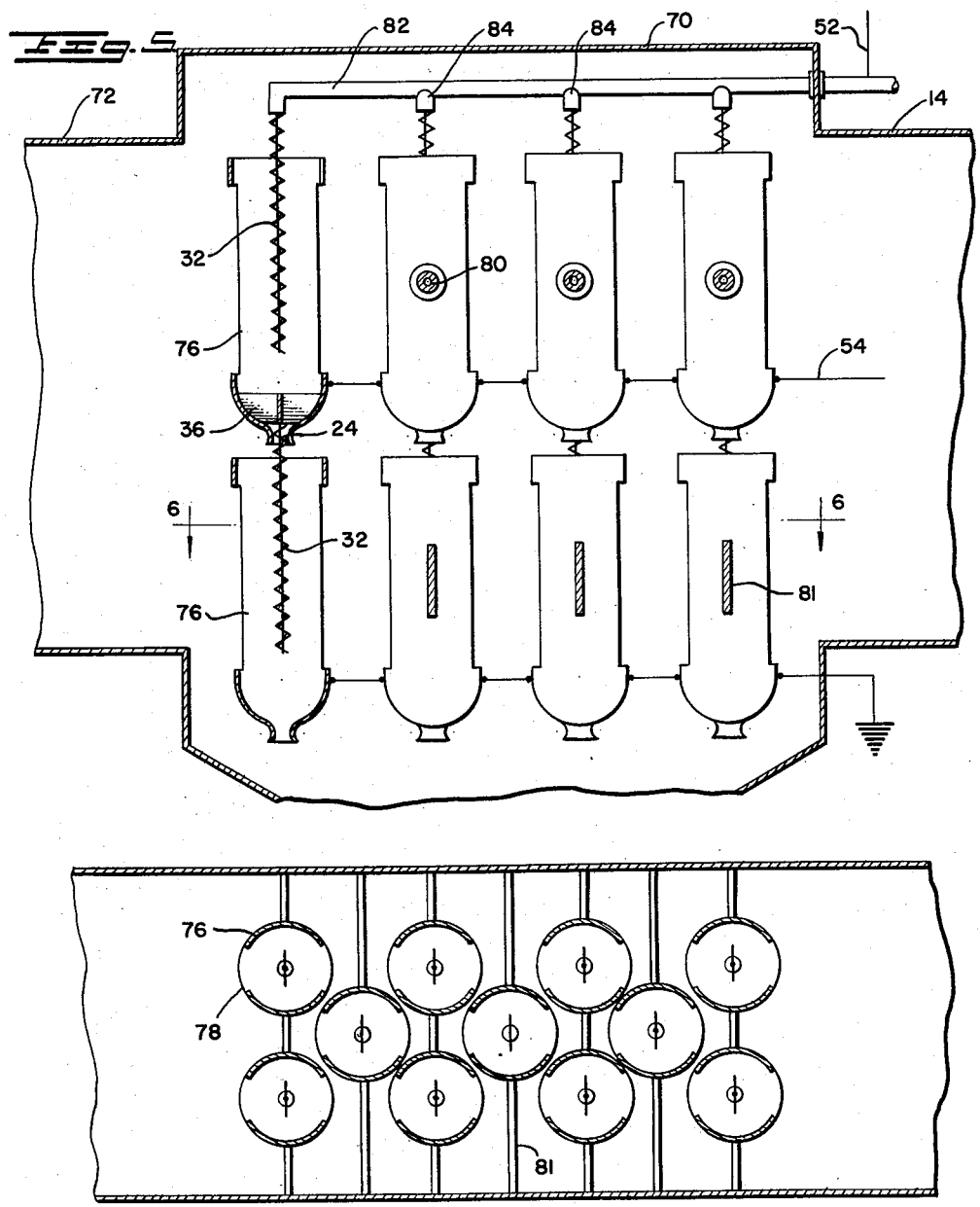

2,907,707
GAS AND LIQUID CONTACT APPARATUS

Harry A. Wintermute, Milford, Pa., assignor to Research Corporation, New York, N.Y., a corporation of New York Application November 1, 1956, Serial No. 619,748

2 Claims. (Cl. 204—312)

This invention relates to apparatus for producing chemical and physical gas-liquid reactions and specifically to novel apparatus for effecting uniform and controlled contact between gases and liquids such as disclosed in my copending application Serial No. 602,636, filed August 7, 1956, now Patent Number 2,867,573.

For example, it is an object of this invention to provide apparatus which is adaptable to effectively and efficiently bring oxygen into contact with water in such an improved manner as to supply a controllable quantity of oxygen atoms to the water to obtain desired chemical and physical action or, for example, to bring about the chemical interaction between chlorine and sulfur dioxide gases and liquid hydrocarbons.

Another object of this invention is the provision of novel apparatus for continuously treating a stream of liquid by passing the liquid, in constant contact with a gas, through a series of treating chambers in which the liquid is sprayed from electrodes by electrical action within each chamber, and wherein the electrodes in each chamber are alternately maintained at opposite polarities through the series of chambers.

A further object of this invention lies in the provision of novel apparatus for treating a stream of liquid with a gas as hereinbefore described wherein each of the treating chamber housings are of a polarity opposite to the polarity of the electrode contained therein.

Another object of this invention resides in the provision of a novel and improved electrode construction for utilization in combination with a treating chamber for gases and liquids wherein the novel construction of the electrode enables the accomplishment of new and improved gas-liquid contact.

A still further object of this invention is the provision of gas liquid treating apparatus including liquid flow controlling means for the introduction of liquid into the treating apparatus.

Still further objects and advantages of this invention will become more readily apparent to those skilled in the art when the following description is read in the light of the accompanying drawings in which:

Fig. 1 is a sectional elevation through a preferred embodiment of the gas-liquid treating apparatus constituting the present invention;

Fig. 2 is a horizontal section taken on line 2—2, Fig. 1;

Fig. 3 is an enlarged fragmentary sectional elevation illustrating the novel electrode structure and liquid discharge from a treating chamber;

Fig. 4 is an elevation in partial section illustrating the improved liquid control valve forming a part of the present invention;

Fig. 5 is a sectional elevation disclosing a modified embodiment of the liquid-gas treating apparatus constituting the present invention; and Fig. 6 is a horizontal sectional view taken on line 6—6, Fig. 5.

The nature of the present invention may be stated in general terms as relating to liquid-gas treating apparatus for bringing about a uniform contact between liquids and gases to obtain desired chemical and physical interaction which apparatus includes in combination a housing, plural treating chambers of substantially cylindrical configuration arranged in end to end relationship vertically within the housing, means for introducing gas at one point in the housing and for removing gas from the housing at a point remote to the gas inlet, a helical electrode supported concentrically within each of said treating chambers, means for supplying controlled volumes of a liquid to the electrode within the uppermost treating chamber, means within the lower end of each treating chamber for collecting and discharging liquid onto the electrode within the next treating chamber therebeneath, and an electrical system having connection with said electrodes and treating chambers maintaining each electrode at opposite polarity to the treating chamber associated therewith and maintaining alternate electrodes in alternate treating chambers at opposite polarities.

In Fig. 1 of the drawings there is disclosed a preferred embodiment of the apparatus constituting the present invention which includes a vertically disposed housing or shell 10 having a gas inlet 12 opening into the lower region of the shell and a gas outlet 14 opening outwardly from the upper region of the shell. A plurality of treating or collecting chambers, generally designated at 16, are arranged in vertical superposed alignment within the shell with each of the treating chambers taking the form of a tubular housing 18 having an open upper end 20 and a conically closed bottom end 22 provided with a restricted flanged opening 24 centrally thereof. The treating chamber housings 18 are located with the bottom central opening 24 of each disposed at closely spaced adjacency to the upper open end 20 of the treating chamber housing 18 immediately therebeneath. The treating chamber housings 18 are supported concentrically within the apparatus housing 10 from the side walls of the housing 10. In the embodiment disclosed the uppermost treating chamber is supported from the side walls of the apparatus housing 10 by means of radially disposed insulators 26 which electrically insulate the housing 18 from the apparatus housing 10. The next treating chamber housing 18 vertically beneath the uppermost housing 18 is supported from the apparatus housing walls 10 by conductive brackets 28 which interconnect the treating chamber housing 18 radially with the apparatus housing walls 10 rigidly supporting the treating chamber and at the same time grounding the chamber wall 18 to the apparatus wall 10. The support arrangements for the treating chambers vertically within the housing alternate throughout the treating chamber series between insulated and conductive supporting members as hereinbefore described.

Concentrically spaced above the upper open end 20 of the uppermost treating chamber 18 is a valved liquid inlet 30, to be hereinafter described in detail, which valved inlet receives and supports an elongated discharge electrode 32 which extends downwardly, concentrically within the uppermost treating chamber to terminate at a spaced distance above the bottom closed end thereof. The electrode 32 takes the form of a metallic spiral or helical ribbon, better seen in Fig. 3, which is provided at equally spaced intervals along its length with perpendicularly projecting wire prongs or pins 34.

A bracket or spider 36 of cross-shaped configuration in plan view and having a lower or bottom end of curvilinear configuration corresponding to the oval configuration defined by the bottom enclosing walls is seated in the bottom of the treating chamber 18 and supports centrally therefrom a second electrode 32 identical to Each of the treating chamber housings 18 in the vertical series is provided with a bracket 36 suspending an electrode 32 therebeneath in the manner hereinbefore described with the exception of the lowermost treating chamber 18 in the series which is not provided with such a bracket or a depending electrode. The lower end of the housing 10 beneath the lowermost treating chamber 18 is provided with a central liquid outlet 38 having communication with a remote point of liquid collection.

Associated in combination with the apparatus described is an electrical system generally designated at 40 which includes by way of example a source 42 of low voltage alternating current connected to the low voltage side of a power transformer 48. It is pointed out that the mechanical rectifier may be replaced with other conventional rectification systems or the energizing current source may be high-voltage direct current. The high-voltage side of the power transformer 48 is connected to two shoes of a four-shoe mechanical rectifier 50 having a rotating commutator 51. The other shoes of the rectifier 50 are connected through one lead 52 to the electrode 32 supported within the uppermost treating chamber 18 while the second lead 54 is connected to the wall of the uppermost treating chamber 18. Additionally, the alternate treating chambers 18 which are supported by insulators 26 from the apparatus wall 10 are electrically interconnected, as at 56, throughout the length of the series of treating chambers within the apparatus housing.

Referring now to Fig. 4 of the drawings there is disclosed in greater detail the liquid inlet control valve 30 which is secured in the liquid inlet header 31 with the lower vertical extension of the header disposed concentrically above the uppermost treating chamber 18. An end closing cap 58 is threadedly secured at the lower end of the extension and is provided with a central opening 60 having a tapered seat 62 about the inner end thereof. A tapered valve 64 is carried by a valved stem 66 which stem is supported in a threaded plug 68 in the upper vertically disposed leg of the fitting and which permits, through said threaded engagement, vertical adjustment of the valve stem and valve relative to the tapered seat 62 about the inner end of the liquid discharge opening 60. In the embodiment shown the valve stem 66 extends through the length of the valve and projects therebeyond concentrically within the liquid discharge opening 60 where it is secured to the upper extended end of the electrode 32 heretofore described as being supported therefrom. By this construction adjusting plug 68 enables the control of liquid volume discharged from the inlet header 31 through the outlet 60 onto the discharge electrode 32.

In the operation of the apparatus described, gas is introduced through inlet 12 into the housing 10 to flow vertically therethrough to be exhausted at outlet 14. In introducing gas under pressure the interior of housing 10 will be substantially completely filled with gas at all times including the interiors of the treating chambers 18.

While maintaining gas in the chamber as described, a continuous stream or flow of liquid is introduced through valve 30 onto the electrode 32 depending concentrically within the uppermost collecting chamber 18. By reason of the helical or spiral configuration of the electrode 32 provided with corona discharge points 34 the liquid will flow vertically of the electrode which electrode is maintained at ground potential at a given polarity under the influence of which potential the liquid will be sprayed outwardly within the treating chamber to be collected on the chamber wall 18, which wall is of opposite polarity to that of the electrode 32. The prongs 34 associated with the electrode 32 establish points of corona discharge all points of which within the construction are equally spaced from the collecting electrode formed by the cylindrical wall of the treating chamber concentrically thereabout.

As the liquid is collected on the wall of the treating chamber 18 it is directed into the conical closed bottom thereof to be discharged onto the discharge electrode 32 supported within the bottom opening 24 of the treating chamber by the bracket 36. From this point the liquid will flow downwardly of the second discharge electrode within the second treating chamber to again be sprayed outwardly for collection by the wall of the second chamber for subsequent discharge to the electrode depending therebeneath in the third chamber. It is to be noted that the second discharge electrode referred to is electrically connected through the bracket 36 to the wall of the uppermost treating chamber thereby establishing a polarity in the electrode identical to that of the walls of the treating chamber thereabove and opposite to the first discharge electrode associated with the uppermost treating chamber. At the same time the wall of the second treating chamber 18 is grounded to the wall 10 of the apparatus housing, the polarity of which housing is established through lead 52 and which is identical to the polarity of the uppermost electrode 32.

Thus, the uppermost electrode 32 by reason of its connection through header 31 and valve 30 will be maintained at ground potential while the wall of the uppermost treating chamber will be maintained at high potential relative thereto. The relationship of the potentials of the electrodes and their associated treating chamber walls will alternately reverse through the vertical series of chambers as the polarity relationship reverses in accordance with the above disclosure.

The above described apparatus is particularly useful when a liquid is to be contacted with a gas such as substantially pure oxygen and the gas is maintained in the housing 10 under pressure. Where the liquid is to be treated with a flowing stream of gas, such as air, a modified form of apparatus is employed, as shown in Figs. 5 and 6.

Referring now to Figs. 5 and 6 of the drawings there is disclosed a modified embodiment of the present invention which operates on substantially the same principles and obtains substantially the identical end result as the hereinbefore described embodiment. In this modified form a plurality of treating chambers are arranged in vertically nested pairs in a horizontally arranged bank within a shell or housing 70 which is provided with a gas inlet 72 over a substantial portion of one side thereof and a gas outlet 74 opposite the inlet in a remote side thereof.

In this construction the treating chambers 76 are substantially identical to the treating chambers 18 hereinbefore described with the singular exception that they are provided with elongated slotted openings 78 in opposed side wall portions thereof with the openings in each chamber being aligned between the gas inlet 72 and the gas outlet 74 and extending vertically of each of the treating chambers from a closely spaced point below the open top of the chamber to a point immediately above the conically closed bottom wall of the chamber.

As is seen in Fig. 5, a plurality of vertically nested pairs of treating chambers are located in the housing 70 with the upper treating chambers in each vertically paired nest supported within housing 70 by insulator support rods 80 connected to the side walls of the housing while the lower treating chambers in each vertically paired nest are supported by conductive support bars 81 secured to and grounded to the side walls of the housing 70. As is seen in Fig. 6 of the drawings, the vertically arranged pairs of treating chambers are arranged in staggered relationship intermediate the gas inlet and gas outlet alternately in spaced pairs and singular nests with the singular nest centered between the centerlines of the paired nests between the gas inlet and outlet in order that the slotted openings 78 in all of the treating chambers in the banked nests are disposed in alignment between the inlet and outlet of the housing 70, In this modification a liquid inlet header 82 is supported horizontally in the upper end of the housing 70 and is provided with a discharge valved fitting 84, identical to valve 30 hereinbefore described, for the uppermost treating chamber 76 in each paired nest in the bank of treating chambers within the housing. Likewise, each of the valved fittings 84 supports an electrode 32 within the upper treating chamber in each paired nest, and a bracket 36 seated in the bottom of each of the upper treating chambers of each of the vertically paired nests supports a second electrode 32 in dependency into the treating chamber 76 immediately therebeneath.

An electrical system identical to that hereinbefore described at 40 is provided to establish high and grounded potentials within the vertically paired chambers in each nest and to reverse to polarities of the electrodes and chamber walls in each as described relative to the preferred embodiment.

In the operation of this latter embodiment of the invention gas introduced into the housing 70 through inlet 72 will flow through the treating chambers 76 entering and leaving each chamber through the opposed slotted opening 78 therein to maintain a continuous gas contact with liquid introduced onto the electrode 32 and sprayed thereby into each treating chamber. By reason of the continuous gas flow in contact with the sprayed liquid within each chamber a maximum efficiency is obtained in the liquid-gas contact and the sprayed liquid is collected on the walls of the treating chamber to be conducted through the central bottom opening 24 therein onto the discharge electrode obtained therefrom into the second and lower treating chamber.

The foregoing embodiments of this apparatus have been noted as being adaptable to the obtaining of interactions between oxygen and water and it is to be understood that this foregoing reference is for purposes of illustration only and that the apparatus has wide use and application in any gas-liquid contact apparatus. It has been discovered that the use of air, for example, as the flowing gas in the disclosed apparatus, will provide for the stripping of only certain gaseous constituents of the air in the treating chambers for intermingling and contact with the liquid sprayed therein with the remaining unutilized constituents in the air stream being exhausted from the apparatus.

It is also contemplated that series arrangements of treating chambers embodying the principles disclosed herein may be utilized in any numbers and in any interarrangement of banks, nests or other series as may be desired to accomplish a desired result in substantially any form of gas-liquid contact apparatus.

It is further pointed out that the apparatus may be constructed of various materials so that it will not be attacked by the gases or liquids employed therein or by the resultant product formed by their interaction. Further, the form of the spiral electrodes may be variously modified to provide a path for the liquid to be treated and active points of corona discharge.

Thus from the foregoing descriptions of the several embodiments of the present invention, it is apparent that novel and unique construction is provided for bringing about liquid-gas contact under controlled conditions for the purpose of obtaining desired chemical and physical actions of the gas and liquid. It is further seen that the constructions hereinbefore described attain and accomplish all of the advantages and objects set forth and achieve the new and improved results described. Accordingly, what is desired to be claimed is:

1. Gas liquid contact apparatus comprising a housing having a spaced gas inlet and gas outlet means, a plurality of superimposed electrically conductive tubular cylinders defining gas treating chambers within said housing between the gas inlet and gas outlet means, a vertically positioned elongate helical discharge electrode extending into each of said plurality of tubular cylinders, each of said discharge electrodes being provided with a plurality of corona discharge forming points, means directing a stream of liquid to the outer surface of the uppermost discharge electrode, means serially conducting said stream of liquid to each successively lower discharge electrode, and electrical means establishing a high potential electric field between each of said discharge electrodes and its respective one of said tubular cylinders with alternate fields being of opposite polarities.

2. Gas liquid contact apparatus comprising a housing having a spaced gas inlet and gas outlet means, a plurality of superimposed electrically conductive elongate tubular shells defining gas treating chambers within said housing between the gas inlet and gas outlet means, each of said tubular cylinders having an open upper end and a restricted outlet centrally of its lower end, a vertically positioned elongate discharge electrode extending into each of said plurality of tubular cylinders, a bracket formed of radially extending arms seated in the bottom end of said tubular cylinders and supporting said discharge electrode centrally therefrom in projection through said restricted bottom outlet into the tubular cylinder immediately therebeneath, means directing a stream of liquid to the outer surface of the uppermost discharge electrode, means serially conducting said stream of liquid to each successively lower discharge electrode, and electrical means establishing the high potential electric field between each of said discharge electrodes and its respective one of said tubular cylinders with alternate fields being of opposite polarities.

References Cited in the file of this patent

UNITED STATES PATENTS

| | | |
|---|---|---|
| 2,027,615 | Prutzman | Jan. 14, 1936 |
| 2,089,793 | Hartman | Aug. 10, 1937 |
| 2,357,354 | Penney | Sept. 5, 1944 |
| 2,525,347 | Gilman | Oct. 10, 1950 |
| 2,590,323 | Jansen et al. | Mar. 25, 1952 |

FOREIGN PATENTS

| | | |
|---|---|---|
| 421,811 | Great Britain | Dec. 20, 1934 |

UNITED STATES PATENT OFFICE
CERTIFICATE OF CORRECTION

Patent No. 2,907,707

October 6, 1959

Harry A. Wintermute

It is hereby certified that error appears in the printed specification of the above numbered patent requiring correction and that the said Letters Patent should read as corrected below.

Column 1, line 72, strike out "that above described." and insert instead -- The nature of the present invention may be stated in --; column 2, line 72, strike out "The nature of the present invention may be stated in --; column 2, line 72, strike out "The nature of the present invention may be stated in" and insert instead -- that above described. --.

Signed and sealed this 10th day of May 1960.

(SEAL)

Attest:

KARL H. AXLINE
Attesting Officer

ROBERT C. WATSON
Commissioner of Patents